United States Patent
Zhang et al.

(10) Patent No.: US 12,221,673 B1
(45) Date of Patent: Feb. 11, 2025

(54) ALUMINUM NITRIDE-REINFORCED ALUMINUM MATRIX COMPOSITE (AMC) AND PREPARATION METHOD THEREOF

(71) Applicant: Inner Mongolia Metal Material Research Institute, Baotou (CN)

(72) Inventors: Mingyi Zhang, Baotou (CN); Ping Gao, Baotou (CN); Wenlong Zhang, Baotou (CN); Zhicheng Shi, Baotou (CN); Wei Wang, Baotou (CN); Linyu Chen, Baotou (CN)

(73) Assignee: Inner Mongolia Metal Material Research Institute, Baotou (CN)

( * ) Notice: Subject to any disclaimer, the term of this patent is extended or adjusted under 35 U.S.C. 154(b) by 0 days.

(21) Appl. No.: 18/904,671

(22) Filed: Oct. 2, 2024

(30) Foreign Application Priority Data

Apr. 28, 2024 (CN) .......................... 202410516280.5

(51) Int. Cl.
| | |
|---|---|
| *C22C 1/05* | (2023.01) |
| *B22F 3/10* | (2006.01) |
| *B22F 3/105* | (2006.01) |
| *B22F 3/16* | (2006.01) |
| *B22F 9/04* | (2006.01) |
| *C22C 1/02* | (2006.01) |
| *C22C 1/03* | (2006.01) |
| *C22C 1/04* | (2023.01) |
| *C22C 21/00* | (2006.01) |
| *C22C 21/02* | (2006.01) |
| *C22C 32/00* | (2006.01) |
| *C22F 1/04* | (2006.01) |

(52) U.S. Cl.
CPC .................. *C22C 1/05* (2013.01); *B22F 3/10* (2013.01); *B22F 3/1017* (2013.01); *B22F 3/16* (2013.01); *B22F 9/04* (2013.01); *C22C 1/026* (2013.01); *C22C 1/03* (2013.01); *C22C 1/0416* (2013.01); *C22C 21/00* (2013.01); *C22C 21/02* (2013.01); *C22C 32/0036* (2013.01); *C22C 32/0047* (2013.01); *C22F 1/04* (2013.01); *B22F 2003/1054* (2013.01); *B22F 2203/11* (2013.01); *B22F 2203/13* (2013.01); *B22F 2301/45* (2013.01); *B22F 2302/10* (2013.01); *B22F 2302/20* (2013.01)

(58) Field of Classification Search
CPC ......... C22C 1/05; C22C 1/0416; C22C 1/026; C22C 1/03; C22C 32/0036; C22C 32/0047; B22F 3/12
See application file for complete search history.

(56) References Cited

U.S. PATENT DOCUMENTS

| | | | |
|---|---|---|---|
| 6,245,439 B1 * | 6/2001 | Yamada | .................... C22C 1/10 |
| | | | 428/116 |
| 2019/0093199 A1 * | 3/2019 | Stuerzel | ................. B22D 18/04 |
| 2019/0293120 A1 * | 9/2019 | Schmitt | ................. F16C 33/121 |

FOREIGN PATENT DOCUMENTS

| | | | | |
|---|---|---|---|---|
| CN | 101435030 B | | 4/2011 | |
| CN | 113930645 A | * | 1/2022 | |
| CN | 114921733 A | * | 8/2022 | ............. C22C 1/026 |
| CN | 115229197 A | * | 10/2022 | |
| CN | 118166244 A | * | 6/2024 | ............. C22C 1/026 |
| WO | WO-9002824 A | * | 3/1990 | ............. C22C 32/00 |

OTHER PUBLICATIONS

GB/T 228.1-2010, "Metallic materials—Tensile Testing—Part 1: Method of test at room temperature", 2009.
GB/T 3651-2008, "Measuring method for thermal conductivity of metal at high temperature", 2008.
Yong et al: "Synthesis and characterization of meso-tetramethyl-tetra-(p-aminophenyl) calix[4] pyrrole", Lanzhou Institute of Chemical Physics, Chinese Academy of Sciences, vol. 24, No. 6, p. 344-345, 2002.

* cited by examiner

*Primary Examiner* — Brian D Walck
*Assistant Examiner* — Austin Pollock
(74) *Attorney, Agent, or Firm* — WCF IP

(57) ABSTRACT

Disclosed are an aluminum nitride-reinforced aluminum matrix composite (AMC) and a preparation method thereof, relating to the technical field of metal matrix composites (MMCs). The aluminum nitride-reinforced AMC includes the following components: Si, Mg, Nb, Zr, Mo, Zn, Ta, Mn, Cu, Co, In, B, Ge, Ir, a rare earth element, Sn, nano-titanium carbide, nano-chromium nitride, an aluminum nitride nanofiber, nano-aluminum nitride, Al, meso-tetramethyl-tetra-(p-aminophenyl) calix[4] pyrrole, sodium silicate, and 1,3,5-triglycidyl-S-triazinetrione.

6 Claims, No Drawings

ALUMINUM NITRIDE-REINFORCED ALUMINUM MATRIX COMPOSITE (AMC) AND PREPARATION METHOD THEREOF

CROSS REFERENCE TO RELATED APPLICATION

This patent application claims the benefit and priority of Chinese Patent Application No. 202410516280.5 filed with the China National Intellectual Property Administration on Apr. 28, 2024, the disclosure of which is incorporated by reference herein in its entirety as part of the present application.

TECHNICAL FIELD

The present disclosure relates to the technical field of metal matrix composites (MMCs), in particular to an aluminum nitride-reinforced aluminum matrix composite (AMC) and a preparation method thereof.

BACKGROUND

Aluminum matrix composite (AMC) is a heterogeneous mixture of aluminum and its alloys as a matrix and metal, non-metal particles, whiskers, or fibers as a reinforcement. The AMC has the advantages such as low density, desirable electrical and thermal conductivity, high specific strength and modulus, high-temperature resistance, wear resistance, low thermal expansion coefficient, and dimensional stability. Therefore, the AMC is widely used in the fields such as aerospace, automobile, electronic packaging, and sports industries.

With the rapid development of modern industry, people have put forward increasing high requirements for AMC. While requiring the AMC to have high strength, it also requires higher thermal conductivity and better wear resistance. It is in this situation that ceramic particle-reinforced AMCs come into being. Since ceramic particles generally have a high melting point and high thermal stability, their reinforcing effect on the aluminum matrix is more significant than alloying elements, making the ceramic particle-reinforced AMCs a research hotspot in recent years. Aluminum nitride, as a common ceramic particle, has desirable mechanical properties and thermal conductivity, making it an excellent reinforcing material for the AMC. However, there is poor wettability between aluminum nitride particles and an AMC matrix, the interface reaction is difficult to control, the aluminum nitride particles are unevenly distributed, and micro-shrinkage holes and cracks are prone to occur. The aluminum nitride-reinforced AMC on the market still shows more or less technical defects such as complex preparation process, limited molding, insufficient thermal conductivity, and mechanical properties that need to be further improved.

In order to solve the above problems, Chinese patent CN101435030B has disclosed a method for preparing an aluminum nitride particle-reinforced AMC in the technical field of metal matrix composites (MMCs). In the method, melamine and an aluminum powder or aluminum alloy powder are prepared into aluminum nitride and aluminum composite particles by mechanical ball milling, the aluminum nitride and the aluminum composite particles are placed in an aluminum package and subjected to degassing and scaling, and then hot isostatic pressing is conducted to prepare the aluminum nitride particle-reinforced AMC. The aluminum nitride particles in the prepared composite show excellent distribution uniformity, desirable interface bonding, and no interface contamination, thereby exhibiting high strength and toughness. However, the wear resistance, corrosion resistance, and thermal conductivity of the composite still need to be further improved.

It can be seen that there is still a need in the art for an aluminum nitride-reinforced AMC showing desirable mechanical properties, excellent wear resistance, corrosion resistance, and thermal conductivity, as well as a long service life, and a preparation method thereof.

SUMMARY

An object of the present disclosure is to provide an aluminum nitride-reinforced AMC with desirable mechanical properties, excellent wear resistance, corrosion resistance, and thermal conductivity, as well as a long service life, and a preparation method thereof in order to overcome the deficiencies of the prior art.

To achieve the above object, the present disclosure provides an aluminum nitride-reinforced AMC, including the following components in percentage by mass: 0.6% to 2% of Si, 0.03% to 0.05% of Mg, 0.1% to 0.3% of Nb, 0.05% to 0.1% of Zr, 0.3% to 0.5% of Mo, 0.4% to 0.6% of Zn, 0.03% to 0.06% of Ta, 0.15% to 0.3% of Mn, 0.5% to 0.9% of Cu, 0.05% to 0.1% of Co, 0.001% to 0.004% of In, 0.001% to 0.003% of B, 0.005% to 0.015% of Ge, 0.001% to 0.003% of Ir, 0.05% to 0.15% of a rare earth element, 0.001% to 0.003% of Sn, 0.01% to 0.03% of nano-titanium carbide, 0.01% to 0.03% of nano-chromium nitride, 5% to 10% of an aluminum nitride nanofiber, and 3% to 5% of nano-aluminum nitride, and Al as a balance.

In some embodiments, the rare earth element is a mixture of Sc, Y, Ce, and Pr at a mass ratio of (1-2):1:(1-3):(0.8-1.2).

In some embodiments, the nano-titanium carbide has a particle size of 10 nm to 80 nm; the nano-chromium nitride has a particle size of 20 nm to 90 nm.

In some embodiments, the aluminum nitride nanofiber has an average diameter of 100 nm to 300 nm and a length of 1 μm to 3 μm.

In some embodiments, the aluminum nitride-reinforced AMC further includes: 0.08 wt % to 0.12 wt % of meso-tetramethyl-tetra-(p-aminophenyl) calix[4] pyrrole, 0.01 wt % to 0.03 wt % of sodium silicate, and 0.02 wt % to 0.05 wt % of 1,3,5-triglycidyl-S-triazinetrione.

In some embodiments, a preparation process of the meso-tetramethyl-tetra-(p-aminophenyl) calix[4] pyrrole is described in: GUO Yong, SHAO Shijun, HE Lijun, et al. Synthesis and characterization of meso-tetramethyl-tetra-(p-aminophenyl) calix[4] pyrrole [J]. *Chemical Reagents,* 2002 (6):344-345.

Another object of the present disclosure is to provide a method for preparing the aluminum nitride-reinforced AMC, comprising the following steps:

step S1, subjecting an aluminum ingot, an Si—Al master alloy, an Mg—Al master alloy, an Nb—Al master alloy, a Zr—Al master alloy, an Mo—Al master alloy, a Zn—Al master alloy, a Ta—Al master alloy, an Mn—Al master alloy, a Cu—Al master alloy, a Co—Al master alloy, an In—Al master alloy, a B—Al master alloy, a Ge—Al master alloy, an Ir—Al master alloy, a rare earth element-Al master alloy, and a Sn—Al master alloy as raw materials to proportioning and then smelting into an alloy melt in a vacuum induction furnace; adding the nano-titanium carbide and the nano-chromium nitride that are preheated at a temperature of 520° C. to 610° C. into the alloy melt, subjecting a resulting mixture to a multi-energy field treatment, pouring a resulting treated mixture into a mold that has been preheated at a temperature of 400° C. to 450° C., and cooling to obtain an aluminum alloy matrix; and step S2, grinding the aluminum alloy matrix obtained in step S1 and then passing through a sieve with 1,000 mesh to 1,200 mesh to obtain an aluminum alloy matrix powder, adding the aluminum alloy matrix powder, the aluminum nitride nanofiber, the nano-aluminum nitride, the meso-tetramethyl-tetra-(p-aminophenyl) calix[4] pyrrole, the sodium silicate, and the 1,3,5-triglycidyl-S-triazinetrione into a powder mixer, and stirring evenly to obtain a mixed powder; loading the mixed powder into a mold, and pressing to obtain a compact; and subjecting the compact to sintering and a heat treatment in sequence to obtain the aluminum nitride-reinforced AMC.

In some embodiments, the smelting in step S1 is conducted at a temperature of 720° C. to 780° C.

In some embodiments, the multi-energy field treatment in step S1 includes a microwave treatment and an ultrasonic treatment, the ultrasonic treatment being conducted at a frequency of 65 kHz to 95 kHz and a power of 550 W to 950 W, and the microwave treatment being conducted at a frequency of 2.5 GHz to 3.1 GHz and a power of 900 W to 1,600 W; and the multi-energy field treatment is conducted for 8 min to 10 min.

In some embodiments, the pressing in step S2 is conducted by a cold isostatic press at a pressure of 120 MPa to 300 MPa.

In some embodiments, the sintering in step S2 is vacuum sintering, and is conducted by: sintering at a temperature of 360° C. to 470° C. for 20 min to 30 min, then raising the temperature to 550° C. to 570° C. at a rate of 3° C./min to 5° C./min, and sintering at the temperature of 550° C. to 570° C. for 30 min to 40 min, and then cooling to room temperature.

In some embodiments, the heat treatment in step S2 includes a solution treatment, an aging treatment, and an annealing treatment; the solution treatment is conducted at a temperature of 485° C. to 515° C. for 1 h to 3 h, followed by water cooling at room temperature; the aging treatment is conducted at a temperature of 190° C. to 270° C. for 5 h to 7 h; the annealing treatment is conducted at a temperature of 410° C. to 500° C. for 4 h to 6 h.

By adopting the foregoing technical solutions, the embodiments of the present disclosure achieve the following advantages and beneficial effects:

(1) The method for preparing the aluminum nitride-reinforced AMC according to the present disclosure has simple process and equipment, convenient operation and control, high preparation efficiency and finished product qualification rate, as well as low dependence on equipment, energy consumption, and capital investment, is suitable for continuous large-scale production, and shows high promotion and application values.

(2) The aluminum nitride-reinforced AMC according to the present disclosure includes the following components in percentage by mass: 0.6% to 2% of Si, 0.03% to 0.05% of Mg, 0.1% to 0.3% of Nb, 0.05% to 0.1% of Zr, 0.3% to 0.5% of Mo, 0.4% to 0.6% of Zn, 0.03% to 0.06% of Ta, 0.15% to 0.3% of Mn, 0.5% to 0.9% of Cu, 0.05% to 0.1% of Co, 0.001% to 0.004% of In, 0.001% to 0.003% of B, 0.005% to 0.015% of Ge, 0.001% to 0.003% of Ir, 0.05% to 0.15% of a rare earth element, 0.001% to 0.003% of Sn, 0.01% to 0.03% of nano-titanium carbide, 0.01% to 0.03% of nano-chromium nitride, 5% to 10% of an aluminum nitride nanofiber, and 3% to 5% of nano-aluminum nitride, and Al as a balance. The mutual coordination and joint action of the various components make the manufactured AMC show desirable mechanical properties, excellent wear resistance, corrosion resistance, and thermal conductivity, as well as a long service life.

(3) The aluminum nitride-reinforced AMC according to the present discourse is reinforced by a dispersion strengthening mechanism by adding a combination of nano-titanium carbide, nano-chromium nitride, aluminum nitride nanofiber, and nano-aluminum nitride. Moreover, the high mechanical properties of the fiber material itself can further improve the mechanical strength of the composite. Moreover, the aluminum nitride-reinforced AMC further includes: 0.08 wt % to 0.12 wt % of meso-tetramethyl-tetra-(p-aminophenyl) calix[4] pyrrole, 0.01 wt % to 0.03 wt % of sodium silicate, and 0.02 wt % to 0.05 wt % of 1,3,5-triglycidyl-S-triazinetrione. The addition of the above components can improve the compatibility between each component, avoid the agglomeration of the reinforcing components, improve their dispersion uniformity, improve the density of an internal structure of the final product, and then improve the product's mechanical properties, wear resistance, corrosion resistance, and thermal conductivity, thereby effectively extending the product's service life. In addition, phenyl calix pyrrole and triazone structures are introduced at the same time, which can not only improve a compatibility between the components under the multiple effects of electronic effect, steric effect, and conjugation effect, but also improve a processing performance, which is more conducive to improving the product precision and promoting the extension of product service life.

(4) In the preparation process of the aluminum nitride-reinforced AMC of the present disclosure, the multi-energy field-assisted treatment of the melt can improve the dispersion uniformity of each component, improve the microstructure and comprehensive performance inside the composite, and then improve the stability of the material performance and extend its service life. First, the aluminum alloy matrix is prepared by smelting and pouring, and then compounded with a reinforcement by powder metallurgy. With the reasonable selection of process parameters, the mechanical properties, wear resistance, corrosion resistance, and thermal conductivity of the composite product can be effectively improved, thereby effectively extending the service life of the product.

DETAILED DESCRIPTION OF THE EMBODIMENTS

The following illustrates in details the present disclosure, such that those skilled in the art can realize the present disclosure. The following preferred embodiments are merely used as an example for description, other apparent variations are likewise conceivable to those skilled in the art.

Example 1: an aluminum nitride-reinforced AMC included (consisted of) the following components in percentage by mass: 0.6% of Si, 0.03% of Mg, 0.1% of Nb, 0.05% of Zr, 0.3% of Mo, 0.4% of Zn, 0.03% of Ta, 0.15% of Mn, 0.5% of Cu, 0.05% of Co, 0.001% of In, 0.001% of B, 0.005% of Ge, 0.001% of Ir, 0.05% of rare earth element, 0.001% of Sn, 0.01% of nano-titanium carbide, 0.01% of nano-chromium nitride, 5% of aluminum nitride nanofiber, 3% of nano-aluminum nitride, and Al as a balance.

The rare earth element was a mixture of Sc, Y, Ce, and Pr at a mass ratio of 1:1:1:0.8; the nano-titanium carbide had a particle size of 10 nm; the nano-chromium nitride had a particle size of 20 nm; and the aluminum nitride nanofiber had an average diameter of 100 nm and a length of 1 μm.

The aluminum nitride-reinforced AMC further included: 0.08 wt % of meso-tetramethyl-tetra-(p-aminophenyl) calix[4] pyrrole, 0.01 wt % of sodium silicate, and 0.02 wt % of 1,3,5-triglycidyl-S-triazinetrione; the preparation method of the meso-tetramethyl-tetra-(p-aminophenyl) calix[4] pyrrole was described in: GUO Yong, SHAO Shijun, HE Lijun, et al. Synthesis and characterization of meso-tetramethyl-tetra-(p-aminophenyl) calix[4] pyrrole [J]. *Chemical Reagents*, 2002 (6):344-345.

A method for preparing the aluminum nitride-reinforced AMC was conducted by the following steps:

step S1, an aluminum ingot, an Si—Al master alloy, an Mg—Al master alloy, an Nb—Al master alloy, a Zr—Al master alloy, an Mo—Al master alloy, a Zn—Al master alloy, a Ta—Al master alloy, an Mn—Al master alloy, a Cu—Al master alloy, a Co—Al master alloy, an In—Al master alloy, a B—Al master alloy, a Ge—Al master alloy, an Ir—Al master alloy, a rare earth element-Al master alloy, and a Sn—Al master alloy as raw materials were subjected to proportioning and then smelting into an alloy melt in a vacuum induction furnace; the nano-titanium carbide and the nano-chromium nitride that were preheated at 520° C. were added into the alloy melt and subjected to a multi-energy field treatment, and a resulting treated mixture was poured into a mold that was preheated at 400° C., and cooled to obtain an aluminum alloy matrix; and step S2, the aluminum alloy matrix obtained in step S1 was ground and then passed through a sieve with 1,000 mesh to obtain an aluminum alloy matrix powder, the aluminum alloy matrix powder, the aluminum nitride nanofiber, the nano-aluminum nitride, the meso-tetramethyl-tetra-(p-aminophenyl) calix[4] pyrrole, the sodium silicate, and the 1,3,5-triglycidyl-S-triazinetrione were added into a powder mixer, and stirred evenly to obtain a mixed powder; the mixed powder was loaded into a mold to allow pressing to obtain a compact; and the compact was subjected to sintering and a heat treatment in sequence to obtain the aluminum nitride-reinforced AMC.

The smelting in step S1 was conducted at a temperature of 720° C.; the multi-energy field treatment in step S1 was a combination of a microwave treatment and an ultrasonic treatment; the ultrasonic treatment was conducted at a frequency of 65 kHz and a power of 550 W; the microwave treatment was conducted at a frequency of 2.5 GHZ and a power of 900 W; and the multi-energy field treatment was conducted for 8 min.

The pressing in step S2 was conducted with a cold isostatic press at 120 MPa; and the sintering in step S2 was vacuum sintering, which was performed by sintering at a temperature of 360° C. for 20 min, then raising the temperature to 550° C. at a rate of 3° C./min, and sintering at 550° C. for 30 min, and then cooling to room temperature.

The heat treatment in step S2 was a combination of a solution treatment, an aging treatment, and an annealing treatment; the solution treatment was conducted at a temperature of 485° C. for 1 h, followed by water cooling at room temperature; the aging treatment was conducted at a temperature of 190° C. for 5 h; and the annealing treatment was conducted at a temperature of 410° C. for 4 h.

Example 2: an aluminum nitride-reinforced AMC included (consisted of) the following components in percentage by mass: 0.9% of Si, 0.035% of Mg, 0.15% of Nb, 0.06% of Zr, 0.35% of Mo, 0.45% of Zn, 0.04% of Ta, 0.2% of Mn, 0.6% of Cu, 0.06% of Co, 0.002% of In, 0.0015% of B, 0.008% of Ge, 0.0015% of Ir, 0.07% of rare earth elements, 0.0015% of Sn, 0.015% of nano-titanium carbide, 0.015% of nano-chromium nitride, 6% of aluminum nitride nanofiber, 3.5% of nano-aluminum nitride, and Al as a balance.

The rare earth element was a mixture of Sc, Y, Ce, and Pr at a mass ratio of 1.2:1:1.5:0.9; the nano-titanium carbide had a particle size of 30 nm; the nano-chromium nitride had a particle size of 30 nm; and the aluminum nitride nanofiber had an average diameter of 150 nm and a length of 1.5 μm.

The aluminum nitride-reinforced AMC further included: 0.09 wt % of meso-tetramethyl-tetra-(p-aminophenyl) calix[4] pyrrole, 0.015 wt % of sodium silicate, and 0.03 wt % of 1,3,5-triglycidyl-S-triazinetrione; the preparation method of the meso-tetramethyl-tetra-(p-aminophenyl) calix[4] pyrrole was described in: GUO Yong, SHAO Shijun, HE Lijun, et al. Synthesis and characterization of meso-tetramethyl-tetra-(p-aminophenyl) calix[4] pyrrole [J]. *Chemical Reagents*, 2002 (6):344-345.

A method for preparing the aluminum nitride-reinforced AMC was conducted by the following steps:

step S1, an aluminum ingot, an Si—Al master alloy, an Mg—Al master alloy, an Nb—Al master alloy, a Zr—Al master alloy, an Mo—Al master alloy, a Zn—Al master alloy, a Ta—Al master alloy, an Mn—Al master alloy, a Cu—Al master alloy, a Co—Al master alloy, an In—Al master alloy, a B—Al master alloy, a Ge—Al master alloy, an Ir—Al master alloy, a rare earth element-Al master alloy, and a Sn—Al master alloy as raw materials were subjected to proportioning and then smelting into an alloy melt in a vacuum induction furnace; the nano-titanium carbide and the nano-chromium nitride that were preheated at 540° C. were added into the alloy melt and subjected to a multi-energy field treatment, a resulting treated mixture was poured into a mold that was preheated at 420° C., and cooled to obtain an aluminum alloy matrix; and step S2, the aluminum alloy matrix obtained in step S1 was ground and then passed through a sieve with 1,050 mesh to obtain an aluminum alloy matrix powder, the aluminum alloy matrix powder, the aluminum nitride nanofiber, the nano-aluminum nitride, the meso-tetramethyl-tetra-(p-aminophenyl) calix[4] pyrrole, the sodium silicate, and the 1,3,5-triglycidyl-S-triazinetrione were added into a powder mixer, and stirred evenly to obtain a mixed powder; the mixed powder was loaded into a mold to allow pressing to obtain a compact; and the compact was subjected to sintering and a heat treatment in sequence to obtain the aluminum nitride-reinforced AMC.

The smelting in step S1 was conducted at a temperature of 740° C.; the multi-energy field treatment in step S1 was a combination of a microwave treatment and an ultrasonic treatment; the ultrasonic treatment was conducted at a frequency of 75 kHz and a power of 650 W; the microwave treatment was conducted at a frequency of 2.7 GHZ and a power of 1,100 W; the multi-energy field treatment was conducted for 8.5 min.

The pressing in step S2 was conducted with a cold isostatic press at 170 MPa; and the sintering in step S2 was vacuum sintering, which was performed by sintering at a temperature of 380° C. for 23 min, then raising the temperature to 555° C. at a rate of 3.5° C./min and sintering at 555° C. for 33 min, and then cooling to room temperature.

The heat treatment in step S2 was a combination of a solution treatment, an aging treatment, and an annealing treatment; the solution treatment was conducted at a temperature of 495° C. for 1.5 h, followed by water cooling at room temperature; the aging treatment was conducted at a temperature of 210° C. for 5.5 h; and the annealing treatment was conducted at a temperature of 430° C. for 4.5 h.

Example 3: an aluminum nitride-reinforced AMC included (consisted of) the following components in percentage by mass: 1.3% of Si, 0.04% of Mg, 0.2% of Nb, 0.08% of Zr, 0.4% of Mo, 0.5% of Zn, 0.045% of Ta, 0.22% of Mn, 0.7% of Cu, 0.07% of Co, 0.0025% of In, 0.002% of B, 0.01% of Ge, 0.002% of Ir, 0.1% of rare earth element, 0.002% of Sn, 0.02% of nano-titanium carbide, 0.02% of nano-chromium nitride, 7.5% of aluminum nitride nanofiber, 4% of nano-aluminum nitride, and Al as a balance.

The rare earth element was a mixture of Sc, Y, Ce, and Pr at a mass ratio of 1.5:1:2:1; the nano-titanium carbide had a particle size of 50 nm; the nano-chromium nitride had a particle size of 60 nm; and the aluminum nitride nanofiber had an average diameter of 200 nm and a length of 2 μm.

The aluminum nitride-reinforced AMC further included: 0.1 wt % of meso-tetramethyl-tetra-(p-aminophenyl) calix [4] pyrrole, 0.02 wt % of sodium silicate, and 0.035 wt % of 1,3,5-triglycidyl-S-triazinetrione; the preparation method of the meso-tetramethyl-tetra-(p-aminophenyl) calix[4] pyrrole was described in: GUO Yong, SHAO Shijun, HE Lijun, et al. Synthesis and characterization of meso-tetramethyl-tetra-(p-aminophenyl) calix[4] pyrrole [J]. *Chemical Reagents,* 2002 (6):344-345.

A method for preparing the aluminum nitride-reinforced AMC was conducted by the following steps:

step S1, an aluminum ingot, an Si—Al master alloy, an Mg—Al master alloy, an Nb—Al master alloy, a Zr—Al master alloy, an Mo—Al master alloy, a Zn—Al master alloy, a Ta—Al master alloy, an Mn—Al master alloy, a Cu—Al master alloy, a Co—Al master alloy, an In—Al master alloy, a B—Al master alloy, a Ge—Al master alloy, an Ir—Al master alloy, a rare earth element-Al master alloy, and a Sn—Al master alloy as raw materials were subjected to proportioning and then smelting into an alloy melt in a vacuum induction furnace; the nano-titanium carbide and the nano-chromium nitride that were preheated at 580° C. were added into the alloy melt and subjected to a multi-energy field treatment, and a resulting treated mixture was poured into a mold that was preheated at 430° C., and cooled to obtain an aluminum alloy matrix; and step S2, the aluminum alloy matrix obtained in step S1 was ground and then passed through a sieve with 1,100 mesh to obtain an aluminum alloy matrix powder, the aluminum alloy matrix powder, the aluminum nitride nanofiber, the nano-aluminum nitride, the meso-tetramethyl-tetra-(p-aminophenyl) calix[4] pyrrole, the sodium silicate, and the 1,3,5-triglycidyl-S-triazinetrione were added into a powder mixer, and stirred evenly to obtain a mixed powder; the mixed powder was loaded into a mold to allow pressing to obtain a compact; and the compact was subjected to sintering and a heat treatment in sequence to obtain the aluminum nitride-reinforced AMC.

The smelting in step S1 was conducted at a temperature of 750° C.; the multi-energy field treatment in step S1 was a combination of a microwave treatment and an ultrasonic treatment; the ultrasonic treatment was conducted at a frequency of 80 kHz and a power of 750 W; the microwave treatment was conducted at a frequency of 2.9 GHZ and a power of 1,300 W; and the multi-energy field treatment was conducted for 9 min.

The pressing in step S2 was conducted with a cold isostatic press at 240 MPa; and the sintering in step S2 was vacuum sintering, which was performed by sintering at a temperature of 420° C. for 25 min, then raising the temperature to 560° C. at a rate of 4° C./min, and e sintering at 560° C. for 35 min, and then cooling to room temperature.

The heat treatment in step S2 was a combination of a solution treatment, an aging treatment, and an annealing treatment; the solution treatment was conducted at a temperature of 500° C. for 2 h, followed by water cooling at room temperature; the aging treatment was conducted at a temperature of 240° C. for 6 h; and the annealing treatment was conducted at a temperature of 460° C. for 5 h.

Example 4: an aluminum nitride-reinforced AMC included (consisted of) the following components in percentage by mass: 1.8% of Si, 0.045% of Mg, 0.25% of Nb, 0.09% of Zr, 0.45% of Mo, 0.55% of Zn, 0.055% of Ta, 0.28% of Mn, 0.85% of Cu, 0.09% of Co, 0.0035% of In, 0.0025% of B, 0.013% of Ge, 0.0025% of Ir, 0.13% of rare earth elements, 0.0025% of Sn, 0.025% of nano-titanium carbide, 0.025% of nano-chromium nitride, 9% of aluminum nitride nanofiber, 4.5% of nano-aluminum nitride, and Al as a balance.

The rare earth element was a mixture of Sc, Y, Ce, and Pr at a mass ratio of 1.8:1:2.5:1.1; the nano-titanium carbide had a particle size of 70 nm; the nano-chromium nitride had a particle size of 80 nm; and the aluminum nitride nanofiber had an average diameter of 250 nm and a length of 2.5 μm.

The preparation component of the aluminum nitride-reinforced AMC further included: 0.11 wt % of meso-tetramethyl-tetra-(p-aminophenyl) calix[4] pyrrole, 0.025 wt % of sodium silicate, and 0.045 wt % of 1,3,5-triglycidyl-S-triazinetrione; the preparation method of the meso-tetramethyl-tetra-(p-aminophenyl) calix[4] pyrrole was described in: GUO Yong, SHAO Shijun, HE Lijun, et al. Synthesis and characterization of meso-tetramethyl-tetra-(p-aminophenyl) calix[4] pyrrole [J]. *Chemical Reagents,* 2002 (6):344-345.

A method for preparing the aluminum nitride-reinforced AMC was conducted by the following steps:

step S1, an aluminum ingot, an Si—Al master alloy, an Mg—Al master alloy, an Nb—Al master alloy, a Zr—Al master alloy, an Mo—Al master alloy, a Zn—Al master alloy, a Ta—Al master alloy, an Mn—Al master alloy, a Cu—Al master alloy, a Co—Al master alloy, an In—Al master alloy, a B—Al master alloy, a Ge—Al master alloy, an Ir—Al master alloy, a rare earth element-Al master alloy, and a Sn—Al master alloy as raw materials were subjected to proportioning and then smelting into an alloy melt in a vacuum induction furnace; the nano-titanium carbide and the nano-chromium nitride that were preheated at 600° C. were added into the alloy melt and subjected to a multi-energy field treatment, a resulting treated mixture was poured into a mold that was preheated at 440° C., and cooled to obtain an aluminum alloy matrix; and step S2, the aluminum alloy matrix obtained in step S1 was ground and then passed through a sieve with 1,150 mesh to obtain an aluminum alloy matrix powder, then the aluminum alloy matrix powder, the aluminum nitride nanofiber, the nano-aluminum nitride, the meso-tetramethyl-tetra-(p-aminophenyl) calix[4] pyrrole, the sodium silicate, and the 1,3,5-triglycidyl-S-triazinetrione were added into a powder mixer, and stirred evenly to obtain a mixed powder; the mixed powder was loaded into a mold to allow pressing to obtain a compact; and the compact was subjected to sintering and a heat treatment in sequence to obtain the aluminum nitride-reinforced AMC.

The smelting in step S1 was conducted at a temperature of 770° C.; the multi-energy field treatment in step S1 was a combination of a microwave treatment and an ultrasonic treatment; the ultrasonic treatment was conducted at a frequency of 90 kHz and a power of 900 W; the microwave treatment was conducted at a frequency of 3 GHz and a power of 1,500 W; and the multi-energy field treatment was conducted for 9.5 min.

The pressing in step S2 was conducted with a cold isostatic press at 280 MPa; and the sintering in step S2 was vacuum sintering, which was performed by sintering at a temperature of 460° C. for 28 min, then raising the temperature to 565° C. at a rate of 4.5° C./min, and sintering at 565° C. for 38 min, and then cooling to room temperature.

The heat treatment in step S2 was a combination of a solution treatment, an aging treatment, and an annealing treatment; the solution treatment was conducted at a temperature of 505° C. for 2.5 h, followed by water cooling at room temperature; the aging treatment was conducted at a temperature of 260° C. for 6.5 h; and the annealing treatment was conducted at a temperature of 490° C. for 5.5 h.

Example 5: an aluminum nitride-reinforced AMC included (consisted of) the following components in percentage by mass: 2% of Si, 0.05% of Mg, 0.3% of Nb, 0.1% of Zr, 0.5% of Mo, 0.6% of Zn, 0.06% of Ta, 0.3% of Mn, 0.9% of Cu, 0.1% of Co, 0.004% of In, 0.003% of B, 0.015% of Ge, 0.003% of Ir, 0.15% of rare earth elements, 0.003% of Sn, 0.03% of nano-titanium carbide, 0.03% of nano-chromium nitride, 10% of aluminum nitride nanofibers, 5% of nano-aluminum nitride, and Al as a balance.

The rare earth element was a mixture of Sc, Y, Ce, and Pr at a mass ratio of 2:1:3:1.2; the nano-titanium carbide had a particle size of 80 nm; the nano-chromium nitride had a particle size of 90 nm; and the aluminum nitride nanofiber had an average diameter of 300 nm and a length of 3 μm.

The aluminum nitride-reinforced AMC further included: 0.12 wt % of meso-tetramethyl-tetra-(p-aminophenyl) calix [4] pyrrole, 0.03 wt % of sodium silicate, and 0.05 wt % of 1,3,5-triglycidyl-S-triazinetrione; the preparation method of the meso-tetramethyl-tetra-(p-aminophenyl) calix[4] pyrrole was described in: GUO Yong, SHAO Shijun, HE Lijun, et al. Synthesis and characterization of meso-tetramethyl-tetra-(p-aminophenyl) calix[4] pyrrole [J]. *Chemical Reagents*, 2002 (6):344-345.

A method for preparing the aluminum nitride-reinforced AMC was conducted by the following steps:

step S1, an aluminum ingot, an Si—Al master alloy, an Mg—Al master alloy, an Nb—Al master alloy, a Zr—Al master alloy, an Mo—Al master alloy, a Zn—Al master alloy, a Ta—Al master alloy, an Mn—Al master alloy, a Cu—Al master alloy, a Co—Al master alloy, an In—Al master alloy, a B—Al master alloy, a Ge—Al master alloy, an Ir—Al master alloy, a rare earth element-Al master alloy, and a Sn—Al master alloy as raw materials were subjected to proportioning and then smelting into an alloy melt in a vacuum induction furnace; the nano-titanium carbide and the nano-chromium nitride that were preheated at 610° C. were added into the alloy melt and subjected to a multi-energy field treatment, and a resulting treated mixture was poured into a mold that was preheated at 450° C., and cooled to obtain an aluminum alloy matrix; and step S2, the aluminum alloy matrix obtained in step S1 was ground and then passed through a sieve with 1,200 mesh to obtain an aluminum alloy matrix powder, then the aluminum alloy matrix powder, the aluminum nitride nanofiber, the nano-aluminum nitride, the meso-tetramethyl-tetra-(p-aminophenyl) calix[4] pyrrole, the sodium silicate, and the 1,3,5-triglycidyl-S-triazinetrione were added into a powder mixer, and stirred evenly to obtain a mixed powder; the mixed powder was loaded into a mold to allow pressing to obtain a compact; and the compact was subjected to sintering and a heat treatment in sequence to obtain the aluminum nitride-reinforced AMC.

The smelting in step S1 was conducted at a temperature of 780° C.; the multi-energy field treatment in step S1 was a combination of a microwave treatment and an ultrasonic treatment; the ultrasonic treatment was conducted at a frequency of 95 kHz and a power of 950 W; the microwave treatment was conducted at a frequency of 3.1 GHz and a power of 1,600 W; and the multi-energy field treatment was conducted for 10 min.

The pressing in step S2 was conducted with a cold isostatic press at 300 MPa; and the sintering in step S2 was vacuum sintering, which was performed by sintering at a temperature of 470° C. for 30 min, then raising the temperature to 570° C. at a rate of 5° C./min, and sintering at 570° C. for 40 min, and then cooling to room temperature.

The heat treatment in step S2 was a combination of a solution treatment, an aging treatment, and an annealing treatment; the solution treatment was conducted at a temperature of 515° C. for 3 h, followed by water cooling at room temperature; the aging treatment was conducted at a temperature of 270° C. for 7 h; and the annealing treatment was conducted at a temperature of 500° C. for 6 h.

Comparative Example 1: an aluminum nitride-reinforced AMC and a preparation method thereof were substantially the same as those in Example 1, except that Mg, Ta, and nano-titanium carbide were not added.

Comparative Example 2: an aluminum nitride-reinforced AMC and a preparation method thereof were substantially the same as those in Example 1, except that In, rare earth element, and meso-tetramethyl-tetra-(p-aminophenyl) calix [4] pyrrole were not added, and nano-aluminum nitride was used instead of the aluminum nitride nanofiber.

In order to further illustrate the beneficial technical effects of the aluminum nitride-reinforced AMCs involved in each example of the present disclosure, the aluminum nitride-reinforced AMCs involved in Examples 1 to 5 and Comparative Examples 1 to 2 were subjected to relevant performance tests. The test results are shown in Table 1, and the test method was as follows:

(1) Thermal conductivity: the thermal conductivity of each aluminum nitride-reinforced AMC was tested in accordance with GB/T 3651-2008 at 100° C.

(2) Tensile strength and elongation: a room-temperature tensile test was conducted in accordance with GB/T228.1-2010 to determine the tensile strength and elongation of each aluminum nitride-reinforced AMC.

(3) Corrosion resistance: an immersion corrosion test was conducted at room temperature (25° C.). The corrosive medium was a 5 wt % NaCl solution. The corrosion specimen was a disc-shaped aluminum nitride-reinforced AMC specimen with a size of @15 mm×3 mm. The corrosion time was 24 h. The weight loss of the AMC specimens before and after corrosion was measured, and the annual corrosion rate of the aluminum nitride-reinforced AMC specimens (unit: mm/a) was calculated based on the surface area of the AMC specimens.

(4) Wear resistance: the aluminum nitride-reinforced AMC samples in each example were tested for friction and wear using an MFT-R4000 high-speed reciprocating friction and wear tester. The test load was 30 N, the test time was 5 min, the friction length was 5×10−3 m, and the friction ball was a φ4 mm $Al_2O_3$ material. A wear volume of the material after friction and wear was measured using a three-dimensional topography instrument to obtain a wear rate. A calculation formula for the wear rate W was as follows: W=m/N·L, where W represents the wear rate (g/N·m); m represents the wear mass (g); N represents the load (N); and L represents the total stroke (m).

TABLE 1

| Item | Tensile strength | Elongation | Thermal conductivity | Wear rate | Corrosion resistance |
|---|---|---|---|---|---|
| Unit | MPa | % | W/m·k | ×10⁻¹⁰ g/N · m | mm/a |
| Example 1 | 716.5 | 11.3 | 320 | 0.03 | 0.103 |
| Example 2 | 720.2 | 12.0 | 323 | 0.02 | 0.095 |
| Example 3 | 722.9 | 12.4 | 325 | 0.02 | 0.085 |
| Example 4 | 727.0 | 12.6 | 330 | 0.01 | 0.071 |
| Example 5 | 730.5 | 12.9 | 332 | 0.01 | 0.066 |
| Comparative Example 1 | 689.3 | 9.6 | 286 | 0.22 | 0.293 |
| Comparative Example 2 | 641.7 | 9.1 | 302 | 0.27 | 0.361 |

As shown in Table 1, the aluminum nitride-reinforced AMC involved in each example of the present disclosure show better thermal conductivity, mechanical properties, corrosion resistance, and wear resistance than those of the comparative examples; the combined use of Mg, Ta, nano-titanium carbide, In, rare earth element, meso-tetramethyl-tetra-(p-aminophenyl) calix[4] pyrrole, and aluminum nitride nanofiber is beneficial for improving the above properties.

The above examples are intended to illustrate only the technical conception and characteristics of the present disclosure, and are intended to enable a person familiar with the technology to understand content of the present disclosure and apply the content accordingly, and shall not limit the scope of protection of the present disclosure thereby. Any equivalent change or modification in accordance with the spiritual essence of the present disclosure shall fall within the scope of protection of the present disclosure.

What is claimed is:

1. An aluminum nitride-reinforced aluminum matrix composite (AMC), comprising the following components in percentage by mass: 0.6% to 2% of Si, 0.03% to 0.05% of Mg, 0.1% to 0.3% of Nb, 0.05% to 0.1% of Zr, 0.3% to 0.5% of Mo, 0.4% to 0.6% of Zn, 0.03% to 0.06% of Ta, 0.15% to 0.3% of Mn, 0.5% to 0.9% of Cu, 0.05% to 0.1% of Co, 0.001% to 0.004% of In, 0.001% to 0.003% of B, 0.005% to 0.015% of Ge, 0.001% to 0.003% of Ir, 0.05% to 0.15% of a rare earth element, 0.001% to 0.003% of Sn, 0.01% to 0.03% of nano-titanium carbide, 0.01% to 0.03% of nano-chromium nitride, 5% to 10% of an aluminum nitride nanofiber, 3% to 5% of nano-aluminum nitride, 0.08% to 0.12% of meso-tetramethyl-tetra-(p-aminophenyl) calix[4] pyrrole, 0.01% to 0.03% of sodium silicate, 0.02% to 0.05% of 1,3,5-triglycidyl-S-triazinetrione, and Al as a balance;
   wherein the rare earth element is a mixture of Sc, Y, Ce, and Pr at a mass ratio of (1-2):1:(1-3):(0.8-1.2); and
   the nano-titanium carbide has a particle size of 10 nm to 80 nm; the nano-chromium nitride has a particle size of 20 nm to 90 nm; and the aluminum nitride nanofiber has an average diameter of 100 nm to 300 nm and a length of 1 μm to 3 μm.

2. A method for preparing the aluminum nitride-reinforced AMC according to claim 1, comprising:
   step S1, subjecting an aluminum ingot, an Si—Al master alloy, an Mg—Al master alloy, an Nb—Al master alloy, a Zr—Al master alloy, an Mo—Al master alloy, a Zn—Al master alloy, a Ta—Al master alloy, an Mn—Al master alloy, a Cu—Al master alloy, a Co—Al master alloy, an In—Al master alloy, a B—Al master alloy, a Ge—Al master alloy, an Ir—Al master alloy, a rare earth element-Al master alloy, and a Sn—Al master alloy as raw materials to proportioning and then smelting into an alloy melt in a vacuum induction furnace; adding the nano-titanium carbide and the nano-chromium nitride that are preheated at a temperature of 520° C. to 610° C. into the alloy melt, subjecting a resulting mixture to a multi-energy field treatment, pouring a resulting treated mixture into a mold that has been preheated at a temperature of 400° C. to 450° C., and cooling to obtain an aluminum alloy matrix; wherein the multi-energy field treatment in step S1 comprises a microwave treatment and an ultrasonic treatment, the ultrasonic treatment being conducted at a frequency of 65 kHz to 95 kHz and a power of 550 W to 950 W, the microwave treatment being conducted at a frequency of 2.5 GHz to 3.1 GHz and a power of 900 W to 1,600 W; and the multi-energy field treatment is conducted for 8 min to 10 min; and
   step S2, grinding the aluminum alloy matrix obtained in step S1 and then passing through a sieve with 1,000 mesh to 1,200 mesh to obtain an aluminum alloy matrix powder, adding the aluminum alloy matrix powder, the aluminum nitride nanofiber, the nano-aluminum nitride, the meso-tetramethyl-tetra-(p-aminophenyl) calix[4] pyrrole, the sodium silicate, and the 1,3,5-triglycidyl-S-triazinetrione into a powder mixer, and stirring evenly to obtain a mixed powder; loading the mixed powder into a mold, and pressing to obtain a compact; and subjecting the compact to sintering and a heat treatment in sequence to obtain the aluminum nitride-reinforced AMC.

3. The method for preparing the aluminum nitride-reinforced AMC according to claim 2, wherein the smelting in step S1 is conducted at a temperature of 720° C. to 780° C.

4. The method for preparing the aluminum nitride-reinforced AMC according to claim 2, wherein the pressing in step S2 is conducted by a cold isostatic press at a pressure of 120 MPa to 300 MPa.

5. The method for preparing the aluminum nitride-reinforced AMC according to claim 2, wherein the sintering in step S2 is vacuum sintering, and is conducted by: sintering at a temperature of 360° C. to 470° C. for 20 min to 30 min, raising the temperature to 550° C. to 570° C. at a rate of 3° C./min to 5° C./min, and sintering at the temperature of 550° C. to 570° C. for 30 min to 40 min, and then cooling to room temperature.

6. The method for preparing the aluminum nitride-reinforced AMC according to claim 2, wherein the heat treatment in step S2 comprises a solution treatment, an aging treatment, and an annealing treatment;
   the solution treatment is conducted at a temperature of 485° C. to 515° C. for 1 h to 3 h, followed by water cooling at room temperature;
   the aging treatment is conducted at a temperature of 190° C. to 270° C. for 5 h to 7 h; and the annealing treatment is conducted at a temperature of 410° C. to 500° C. for 4 h to 6 h.

* * * * *